May 1, 1945. O. KYLIN 2,375,114
INDEXING MECHANISM
Filed Jan. 21, 1943 2 Sheets-Sheet 1

OSKAR KYLIN
INVENTOR.

BY Hawgood & Van Horn
HIS ATTORNEYS

May 1, 1945. O. KYLIN 2,375,114
INDEXING MECHANISM
Filed Jan. 21, 1943 2 Sheets-Sheet 2
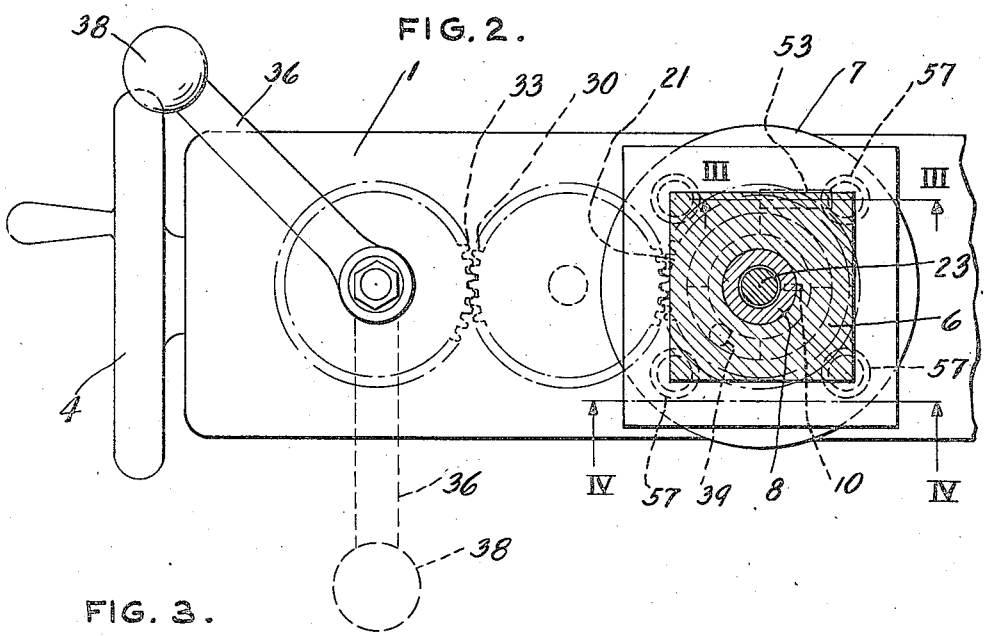
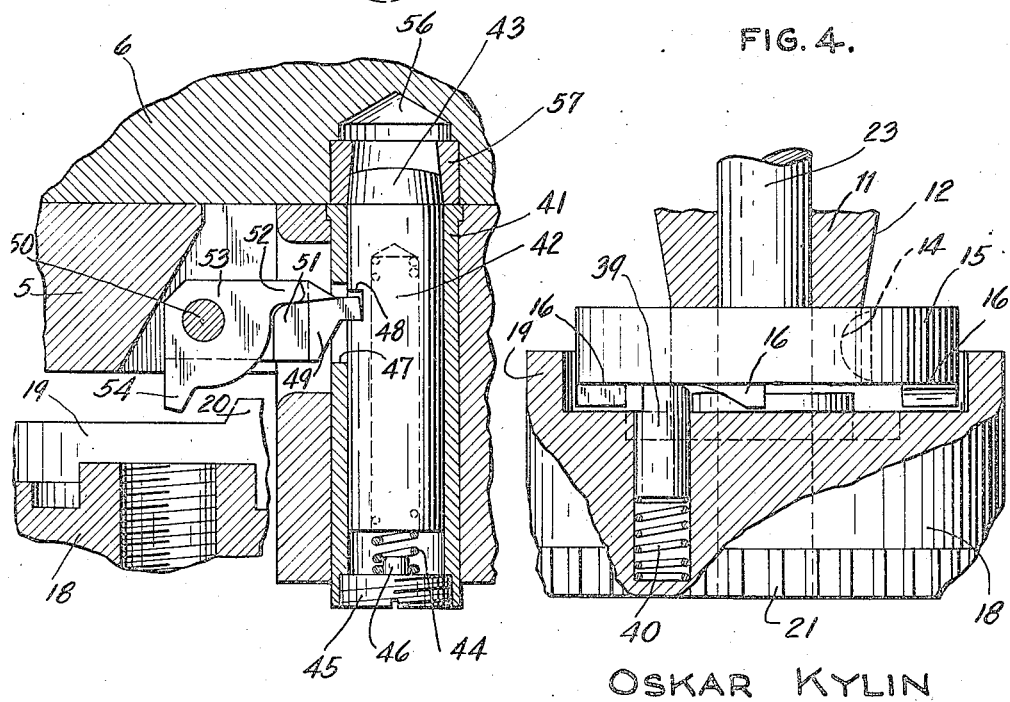
OSKAR KYLIN
INVENTOR.
BY Haugood & VanHorn
HIS ATTORNEYS Patented May 1, 1945

2,375,114

UNITED STATES PATENT OFFICE 2,375,114

INDEXING MECHANISM

Oskar Kylin, Cleveland Heights, Ohio, assignor to Bardons and Oliver, Inc., Cleveland, Ohio, a corporation of Ohio Application January 21, 1943, Serial No. 473,055

7 Claims. (Cl. 29—49)

This invention relates to an indexing mechanism particularly adapted for use in machine tools and similar devices where a plurality of articles are to be brought into definite positions.

An object of the invention is to provide an improved indexing mechanism capable of bringing selectively into operative position any of a plurality of articles.

Another object is to provide an improved indexing mechanism which will hold such articles with extreme accuracy.

Another object is to provide an improved indexing mechanism which may be simply and easily operated.

Another object is to provide an improved indexing mechanism consisting of few, simple and rugged parts.

Another object is to provide an improved indexing mechanism which may be easily and economically manufactured and assembled.

Another object is to provide an improved indexing mechanism which will accurately and positively locate parts in their desired positions.

Other objects will hereinafter appear.

The invention will be better understood for the description of one practical embodiment thereof, illustrated in the accompanying drawings, in which:

Figure 2 is a plan view of the parts of Figure 1 to a reduced scale, some of the parts being shown in section taken on line II—II of Figure 1.

Figure 3 is an enlarged fragmentary vertical sectional view taken on the line III—III of Figure 2.

Figure 4 is an enlarged fragmentary sectional view taken on the line IV—IV of Figure 2.

Figure 1:
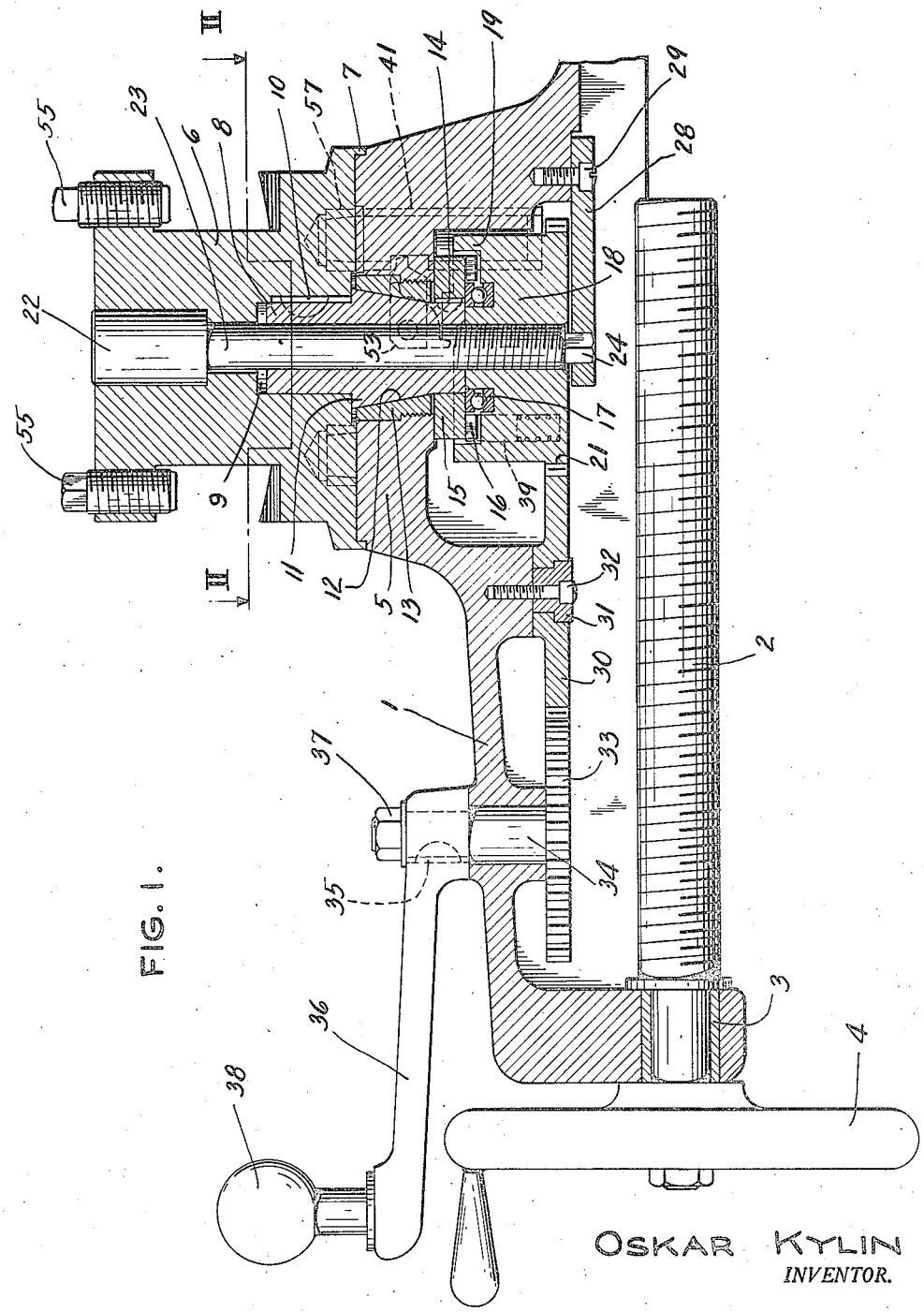
Figure 1 is a fragmentary cross-sectional view of a part of a machine tool, which is illustrated as including a cross slide carrying an indexible part such as a turret on which a plurality of tools may be mounted.

The drawings illustrate parts which may conveniently be used upon a turret lathe of generally conventional or any desired type, the bed, head and tail stocks and other parts being omitted because they are well understood and in the interest of brevity. The figures show the parts which constitute the tool holding turret thereof.

The apparatus shown is carried upon a main supporting frame 1, which may well be a cross slide movable upon the carriage of a lathe and adjustable transversely of the lathe bed by means of a lead screw 2 journaled at 3 in a depending boss at the front end of the cross slide and rotatable by means of a hand wheel 4 keyed or otherwise fixed to the lead screw. The screw is, of course, threaded through some stationary part associated with the carriage or lathe bed.

The cross slide is formed with an upwardly extending hollow boss 5, upon which the turret proper 6 is supported, the turret having a depending cylindrical marginal flange 7 fitting a corresponding groove or recess in the top of the boss to assist in locating these parts and to exclude the entrance of dirt, chips, and the like, from the space between them.

The turret is more accurately positioned upon the boss by means of a pivot plug 8 having its upper cylindrical end fitting within a cylindrical recess 9 within which it may slide vertically with respect to the turret, being locked against rotation relatively thereto by means of a Woodruff key 10.

Below the cylindrical portion, the plug is formed with a shoulder 11 abutting the underside of the turret, and below this shoulder the plug is tapered, as indicated at 12, the taper fitting the tapered interior of a bushing 13 threaded into the top of the boss 5. Below the tapered portion, plug 8 is cylindrical in form and has keyed to it, by means of a Woodruff key 14, a disc 15 provided on its undersurface with a plurality of ratchet teeth 16.

Bearing upon the underside of disc 15 and also upon the end of plug 8 is the upper race of a thrust ball bearing 17, the lower race of which is received in a circular groove in the upper face of a drum 18. The drum has an upwardly extending cylindrical flange 19 provided with an upwardly extending lug or cam 20 for a purpose to be hereinafter described, and is provided on its lower edge with gear teeth 21, forming an external spur gear unitary with the drum.

Passing downwardly through the turret 6, plug 8, and drum 18 is a bolt comprising a head 22 received in a recess in the upper part of the turret and a shank 23 threaded at its lower end to engage a conjugate thread through the drum. The lower end of the bolt is squared as indicated at 24 and is held in any desired adjusted position by a bar 28 having a squared aperture fitting this bolt end, the bar being secured to the underside of the cross slide by a screw 29. It will be evident that the bolt may be loosened or tightened to any desired extent simply upon the loosening of screw 29, and that after it is adjusted the screw may be replaced to lock the bolt with respect to the cross slide.

Meshing with the gear 21 is an idler 30 pivotally mounted on a stub shaft 31 held to the underside of the cross slide by a screw 32. Meshing with the idler is a gear 33 fixed to or made unitarily with the lower end of a shaft 34, the shaft extending upwardly through the upper surface of the cross slide and having keyed to it, by a key 35, an operating lever or crank 36 clamped to the shaft by a nut 37 threaded on the threaded end of the latter. The lever 36 is provided on its outer end with an operating knob or handle 38.

In a recess extending downwardly from the upper surface of the drum 18 is a pawl or detent 39, urged against the underside of disc 15 by a compression spring 40.

Mounted within a vertical hole extending down from the top of the boss 5 is a sleeve 41 in which is carried a generally cylindrical plunger or locking bolt 42 provided at its upper end with a frusto-conical surface 43. Within the sleeve and below the bolt is a helical compression spring 44, being retained in place by a plug 45 threaded into the bottom of the sleeve and provided with a central lug or pilot 46 fitting within and locating the end of the spring.

One side of the sleeve is slotted as indicated at 47, and a notch 48 is formed in the locking plunger adapted to be brought into alignment in this slot.

Through this slot and into the notch extends the end of a lever 49, the lever being pivoted upon a pin 50 within the boss 5. The lever has a projecting boss 51 upon which normally rests one arm 52 of a bell crank lever 53, also pivoted upon the pin 50. The other arm 54 of the bell crank lever lies in the path of lug 20.

Upon the top of the turret 6 are means for holding tools, being indicated in the drawings as the screws 55, but it will be understood that any desired form of tool or tool holder may be secured in any well known manner, and that these tools will be determined by the work which it is desired to produce, being different for nearly every variation in product.

In definite relation to each of the tool holders 55 is a recess 56 extending upwardly from the underside of the turret 6, and each recess is shown as provided with a bushing 57 having a frusto-conical inner surface adapted to cooperate with head 43 of the locking bolt. These bushings may be of hard material, to impart long life with little wear.

The operation of the device is as follows:

With a plurality of appropriate tools mounted on the top of the turret in properly adjusted positions, when the operator desires to index his mechanism to bring them successively into operative position, he merely rotates the handle 38 in a counter-clockwise direction from the position shown in solid lines in Figure 2 to that shown in dotted lines therein. This motion is transmitted through the idler 30 to the gear 21, causing this likewise to move in a counter-clockwise direction. This carries the pawl 39 around past one of the ratchet teeth 16 and brings the lug 20 into contact with the arm 54 of the bell crank 53, rocking this bell crank in a clockwise direction as seen in Figure 3. This motion in turn moves arm 52 down upon the lug 51, carrying lever 49 downwardly, and with it the locking bolt 42 until this clears the lower end of the bushing 57, thus unlocking the turret from the boss 5.

The same motion loosens the drum upon the threads of bolt 23, and it will be noted that in the form illustrated this must be a left hand thread.

The operator then returns the lever by reversing his movement of the handle to a clockwise direction to the position shown in solid lines. During this motion the turret is free to turn, and is carried along by the pawl 39 in engagement with the vertical side of one of the ratchet teeth 16.

As soon as this motion has progressed sufficiently to remove lug 20 from its contact with arm 54, the locking bolt or plunger is free to travel upwardly under the impetus of the spring 44, and therefore presses against and rides along the plane undersurface of the turret 6 until it comes into registry with the next recess 56 and bushing 57.

Upon the occurrence of such registry the bolt is shot upwardly by the spring, the tapered end wedging snugly into the bushing 57, and so positively and accurately stopping and locating the turret at its next indexed position.

While I have described the illustrated embodiment of my invention in some particularity, obviously many other embodiments, variations, and modifications thereof will readily occur to those skilled in the art to which it appertains, and I do not, therefore, limit myself to the precise details shown and described, but claim as my invention all embodiments, variations and modifications coming within the scope of the subjoined claims.

I claim:

1. An indexing means comprising a support, a pivot carried thereby, a turret rotatably mounted on said pivot, an actuating drum rotatably mounted on said pivot, a bolt carried by said base and engageable with the turret to selectively lock the same in a plurality of positions, a spring bearing upon said bolt and urging it to locking position, bell crank mechanism associated with the bolt, a cam on said drum cooperating with said bell crank mechanism to retract said bolt against said spring, a ratchet fixed with respect to said turret, a spring pressed detent engaging said ratchet and carried by said drum, and actuating mechanism for rotating said drum.

2. An indexing means comprising a support, a pivot carried thereby, a turret rotatably mounted on said pivot, an actuating drum rotatably mounted on said pivot, a bolt carried by said base and engageable with the turret to selectively lock the same in a plurality of positions, a spring bearing upon said bolt and urging it to locking position, bell crank mechanism associated with the bolt, a cam on said drum cooperating with said bell crank mechanism to retract said bolt against said spring, a ratchet fixed with respect to said turret, a spring pressed detent engaging said ratchet and carried by said drum, and actuating mechanism for rotating said drum comprising a gear train connected to said drum and terminating in a manually movable crank.

3. An indexing means comprising a support, a pivot carried thereby, a turret rotatably mounted on said pivot, an actuating drum rotatably mounted on said pivot, clamping means interposed between the turret and drum arranged to clamp them on opposite sides of the base, a bolt carried by said base and engageable with the turret to selectively lock the same in a plurality of positions, a spring bearing upon said bolt and urging it to locking position, bell crank mechanism associated with the bolt, a cam on said drum cooperating with said bell crank mechanism to retract said bolt against said spring, a ratchet fixed with respect to said turret, a spring pressed detent engaging said ratchet and carried by said drum, and actuating mechanism for rotating said drum.

4. An indexing means comprising a base, a turret rotatably mounted thereon, a pivot passing through the base and secured to rotate with said turret, a ratchet secured to rotate with said pivot on the opposite side of the base, a bolt passing through the turret and pivot, a drum threaded on said bolt and bearing against said ratchet, locking means holding said bolt against rotation, a spring pressed detent carried by said drum in engagement with said ratchet, driving means connected to said drum, and locking means interposed between the base and the turret.

5. An indexing means comprising a base, a turret rotatably mounted thereon, a pivot passing through the base and secured to rotate with said turret, a ratchet secured to rotate with said pivot on the opposite side of the base, a bolt passing through the turret and pivot, a drum threaded on said bolt and bearing against said ratchet, locking means holding said bolt against rotation, a spring pressed detent carried by said drum in engagement with said ratchet, driving means connected to said drum, a locking bolt interposed between the base and the turret, levers interposed between the bolt and the drum arranged to move the bolt in one direction, and a spring bearing upon the bolt to urge it in the opposite direction.

6. An indexing means comprising a base, a turret rotatably mounted thereon, a pivot passing through the base and secured to rotate with said turret, a ratchet secured to rotate with said pivot on the opposite side of the base, a bolt passing through the turret and pivot, a drum threaded on said bolt and bearing against said ratchet, locking means holding said bolt against rotation, a spring pressed detent carried by said drum in engagement with said ratchet, driving means connected to said drum, a locking bolt interposed between the base and the turret, levers interposed between the bolt and the drum arranged to move the bolt in one direction, a spring bearing upon the bolt to urge it in the opposite direction, a gear train connected to said drum, and a manually actuable crank connected to said gear train.

7. An indexing means comprising a base, a turret rotatably mounted thereon, a pivot passing through the base and secured to rotate with said turret, a ratchet secured to rotate with said pivot on the opposite side of the base, a bolt passing through the turret and pivot, a drum threaded on said bolt and bearing against said ratchet, locking means holding said bolt against rotation, a spring pressed detent carried by said drum in engagement with said ratchet, driving means connected to said drum, and locking means interposed between the base and the turret, said last named locking means including a bolt, a spring urging it in one direction, a lever engaging the bolt, and a cam carried by the drum and engageable with the lever.

OSKAR KYLIN.